United States Patent
Xu et al.

(10) Patent No.: US 10,427,716 B2
(45) Date of Patent: Oct. 1, 2019

(54) HITCH ASSIST SYSTEM AND METHOD

(71) Applicant: Ford Global Technologies, LLC, Dearborn, MI (US)

(72) Inventors: Li Xu, Northville, MI (US); Kyle Simmons, New Boston, MI (US); Chen Zhang, Canton, MI (US); Eric Hongtei Tseng, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 225 days.

(21) Appl. No.: 15/701,644

(22) Filed: Sep. 12, 2017

(65) Prior Publication Data

US 2019/0077457 A1 Mar. 14, 2019

(51) Int. Cl.
| B62D 15/02 | (2006.01) |
| B60D 1/06 | (2006.01) |
| B60D 1/36 | (2006.01) |
| B60D 1/62 | (2006.01) |

(52) U.S. Cl.
CPC ............. B62D 15/029 (2013.01); B60D 1/06 (2013.01); B60D 1/36 (2013.01); B60D 1/62 (2013.01); B62D 15/021 (2013.01); B62D 15/028 (2013.01); B62D 15/0285 (2013.01)

(58) Field of Classification Search
CPC .. B62D 15/029; B62D 15/021; B62D 15/028; B62D 15/0285; B60D 1/06; B60D 1/36; B60D 1/62
See application file for complete search history.

(56) References Cited

U.S. PATENT DOCUMENTS

| 5,191,328 | A | * | 3/1993 | Nelson | B60D 1/36 250/491.1 |
| 6,222,457 | B1 | * | 4/2001 | Mills | B60D 1/36 250/491.1 |
| 6,765,607 | B2 | * | 7/2004 | Mizusawa | B60D 1/36 348/118 |
| 7,777,615 | B2 | * | 8/2010 | Okuda | B60D 1/36 280/477 |
| 8,498,770 | B2 | | 7/2013 | Takano | |
| 8,825,262 | B2 | | 9/2014 | Lee et al. | |
| 9,174,672 | B2 | | 11/2015 | Zeng et al. | |
| 9,227,474 | B2 | | 1/2016 | Liu | |
| 9,340,228 | B2 | | 5/2016 | Xu et al. | |
| 9,403,413 | B2 | * | 8/2016 | Talty | B60D 1/36 |
| 9,434,414 | B2 | | 9/2016 | Lavoie | |

(Continued)

FOREIGN PATENT DOCUMENTS

| CN | 202676174 U | 1/2013 |
| DE | 102007029413 A1 | 1/2009 |

(Continued)

*Primary Examiner* — Sze-Hon Kong
(74) *Attorney, Agent, or Firm* — Raymond Coppiellie; Price Heneveld LLP

(57) ABSTRACT

A hitch assist system and method are provided herein. A device is configured to detect a hitch coupler of a trailer and a controller is in communication with the device. The controller is configured to generate a boundary area projecting from the hitch coupler, define a vehicle backup path toward the trailer if a tow hitch of the vehicle is located inside the boundary area, and determine a steering angle for steering the vehicle along the vehicle backup path.

19 Claims, 14 Drawing Sheets

(56) References Cited

U.S. PATENT DOCUMENTS

| | | |
|---|---|---|
| 9,464,913 B2 | 10/2016 | Brown et al. |
| 9,834,140 B2 * | 12/2017 | Windeler .................. B60R 1/00 |
| 2002/0149673 A1 * | 10/2002 | Hirama ..................... B60R 1/00 |
| | | 348/118 |
| 2005/0074143 A1 * | 4/2005 | Kawai ..................... B60D 1/36 |
| | | 382/104 |
| 2010/0096203 A1 * | 4/2010 | Freese, V ............... B60D 1/36 |
| | | 180/167 |
| 2013/0226390 A1 | 8/2013 | Luo et al. |
| 2013/0321634 A1 | 12/2013 | Okano et al. |
| 2014/0012465 A1 * | 1/2014 | Shank ..................... B60D 1/58 |
| | | 701/36 |
| 2014/0267688 A1 * | 9/2014 | Aich ..................... H04N 7/181 |
| | | 348/113 |
| 2016/0001705 A1 | 1/2016 | Greenwood et al. |
| 2016/0052548 A1 * | 2/2016 | Singh ..................... B60D 1/36 |
| | | 701/37 |
| 2016/0129939 A1 | 5/2016 | Singh et al. |
| 2016/0304122 A1 | 10/2016 | Herzog et al. |
| 2016/0375831 A1 * | 12/2016 | Wang ..................... G06F 3/048 |
| | | 348/148 |
| 2018/0029429 A1 * | 2/2018 | Janardhana ............... B60D 1/36 |
| 2018/0061102 A1 * | 3/2018 | Goto ....................... B60D 1/36 |
| 2018/0147900 A1 * | 5/2018 | Shank ............... B62D 15/0285 |
| 2018/0215382 A1 * | 8/2018 | Gupta ..................... G08G 1/165 |
| 2018/0253106 A1 * | 9/2018 | Inui ........................... B60R 1/00 |
| 2019/0092109 A1 * | 3/2019 | Carpenter .......... B62D 15/0285 |
| 2019/0143895 A1 * | 5/2019 | Pliefke ..................... B60R 1/00 |

FOREIGN PATENT DOCUMENTS

| | | |
|---|---|---|
| DE | 102012005707 A1 | 10/2012 |
| WO | 2014167255 A1 | 10/2014 |
| WO | 2015187467 A1 | 12/2015 |
| WO | 2015197225 A1 | 12/2015 |

\* cited by examiner

HITCH ASSIST SYSTEM AND METHOD

FIELD OF THE INVENTION

The present invention generally relates to vehicle backup assist systems, and more particularly, to vehicle backup assist systems that facilitate the hitching of a vehicle to a trailer.

BACKGROUND OF THE INVENTION

Reversing a vehicle toward a trailer in order to attach a tow hitch to a trailer coupler can be challenging for many drivers, particularly those who are unfamiliar with trailers and the hitching process in general. Accordingly, there is a need for a system that assists a driver in navigating a vehicle toward the trailer such that a hitch connection can be made therebetween. The present disclosure is intended to satisfy this need.

SUMMARY OF THE INVENTION

According to a first aspect of the present invention, a hitch assist system is provided. The system includes a device configured to detect a hitch coupler of a trailer and a controller in communication with the device. The controller is configured to generate a boundary area projecting from the hitch coupler, define a vehicle backup path toward the trailer if a tow hitch of a vehicle is located inside the boundary area, and determine a steering angle for steering the vehicle along the vehicle backup path.

Embodiments of the first aspect can include any one or a combination of the following features:

- the hitch coupler includes a coupler ball socket and the tow hitch includes a hitch ball;
- the boundary area is a sector that includes a plane enclosed by a first radius, a second radius, and an arc therebetween;
- the size of the sector is based on an angle between the first and second radii, the angle determined based on a minimum turning radius of the vehicle and a distance from the tow hitch to a rear axle of the vehicle;
- the boundary area has a fixed size and an aim direction that changes based on a heading angle of the vehicle with respect to a longitudinal axis of the trailer;
- the vehicle backup path has a trajectory corresponding to the shortest distance between the tow hitch and the hitch coupler;
- the steering angle is based on an angle of the vehicle backup path with respect to a longitudinal axis of the trailer, and a heading angle of the vehicle with respect to the longitudinal axis of the trailer;
- the vehicle backup path has a trajectory that is entirely circular and having a constant curvature;
- the steering angle is based on a heading angle of the vehicle with respect to a longitudinal axis of the trailer, and a positional change of the tow hitch;
- the vehicle backup path has a first trajectory that is circular followed by a second trajectory that is straight;
- the first trajectory transitions to the second trajectory when a longitudinal axis of the vehicle intersects with the hitch coupler;
- if the tow hitch is located outside the boundary area, the controller determines if the tow hitch is located in a region in front of the trailer and defined by a first bound and a second bound, and wherein if the tow hitch is located inside the region, the controller determines a backup path for reversing the vehicle so as to move the tow hitch inside the boundary area; and
- a display for dynamically displaying at least one of the region and the boundary area.

According to a second aspect of the present invention, a hitch assist system is provided and includes a device configured to detect a hitch coupler of a trailer and a controller in communication with the device. The controller is configured to define a vehicle backup path terminating at or near the hitch coupler. The vehicle backup path has a trajectory that is at least one of circular and straight. The controller is also configured to determine a steering angle for steering a vehicle along the vehicle backup path.

Embodiments of the second aspect can include any one or a combination of the following features:

- the controller defines the vehicle backup path if a tow hitch of the vehicle is located inside a dynamic boundary area projecting from the hitch coupler;
- the boundary area is a sector that includes a plane enclosed by a first radius, a second radius, and an arc therebetween, and wherein the size of the sector is based on an angle between the first and second radii, the angle determined based on a minimum turning radius of the vehicle and a distance from the tow hitch to a rear axle of the vehicle;
- the boundary area has a fixed size and an aim direction that changes based on a heading angle of the vehicle with respect to a longitudinal axis of the trailer;
- the vehicle backup path has a trajectory corresponding to the shortest distance between a tow hitch of the vehicle and the hitch coupler; and
- the vehicle backup path has a trajectory that is entirely circular and having a constant curvature or a trajectory that is circular and then straight.

According to a third aspect of the present invention, a hitch assist method is provided and includes the steps of detecting a hitch coupler of a trailer, generating a boundary area projecting from the hitch coupler, defining a vehicle backup path toward the trailer if a tow hitch of a vehicle is located inside the boundary area, and determining a steering angle for steering the vehicle along the vehicle backup path.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
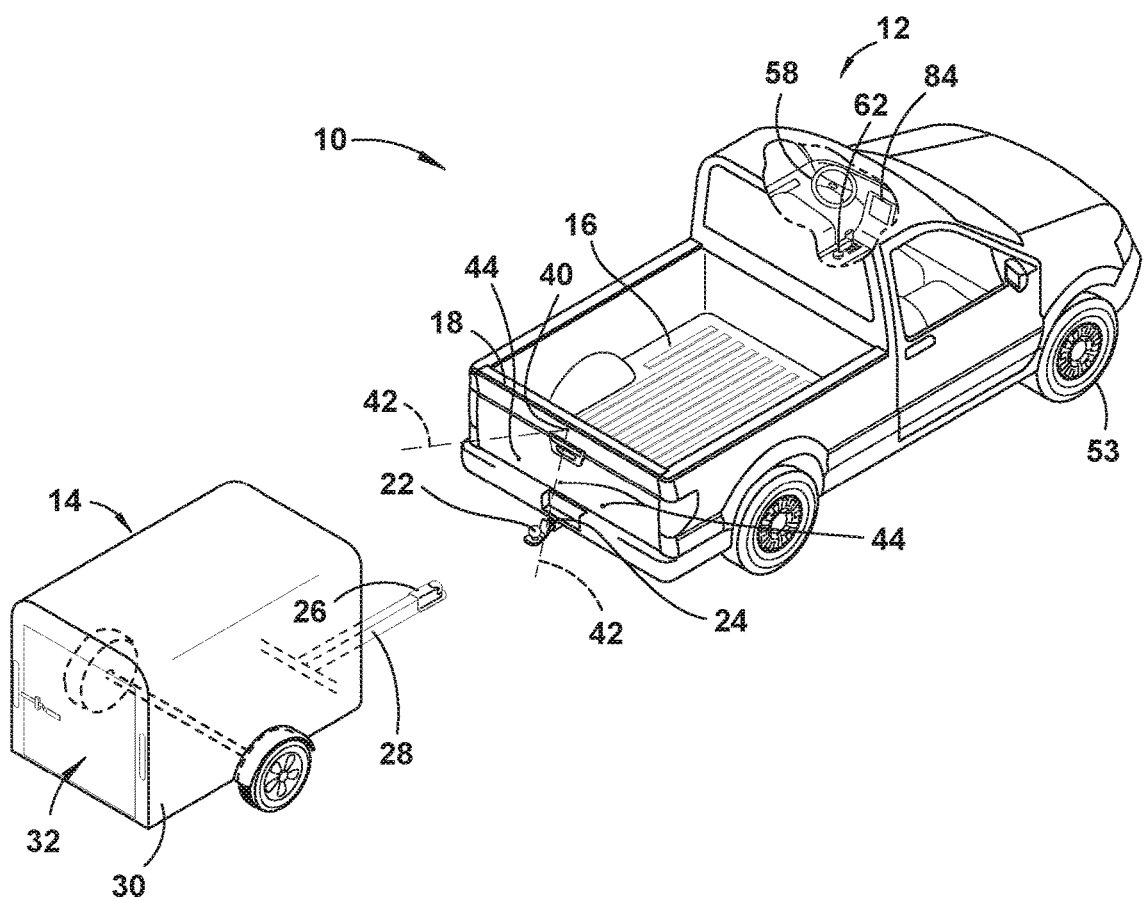
FIG. 1 is a top perspective view of a vehicle and a trailer, the vehicle being equipped with a hitch assist system according to one embodiment.
Figure 2:
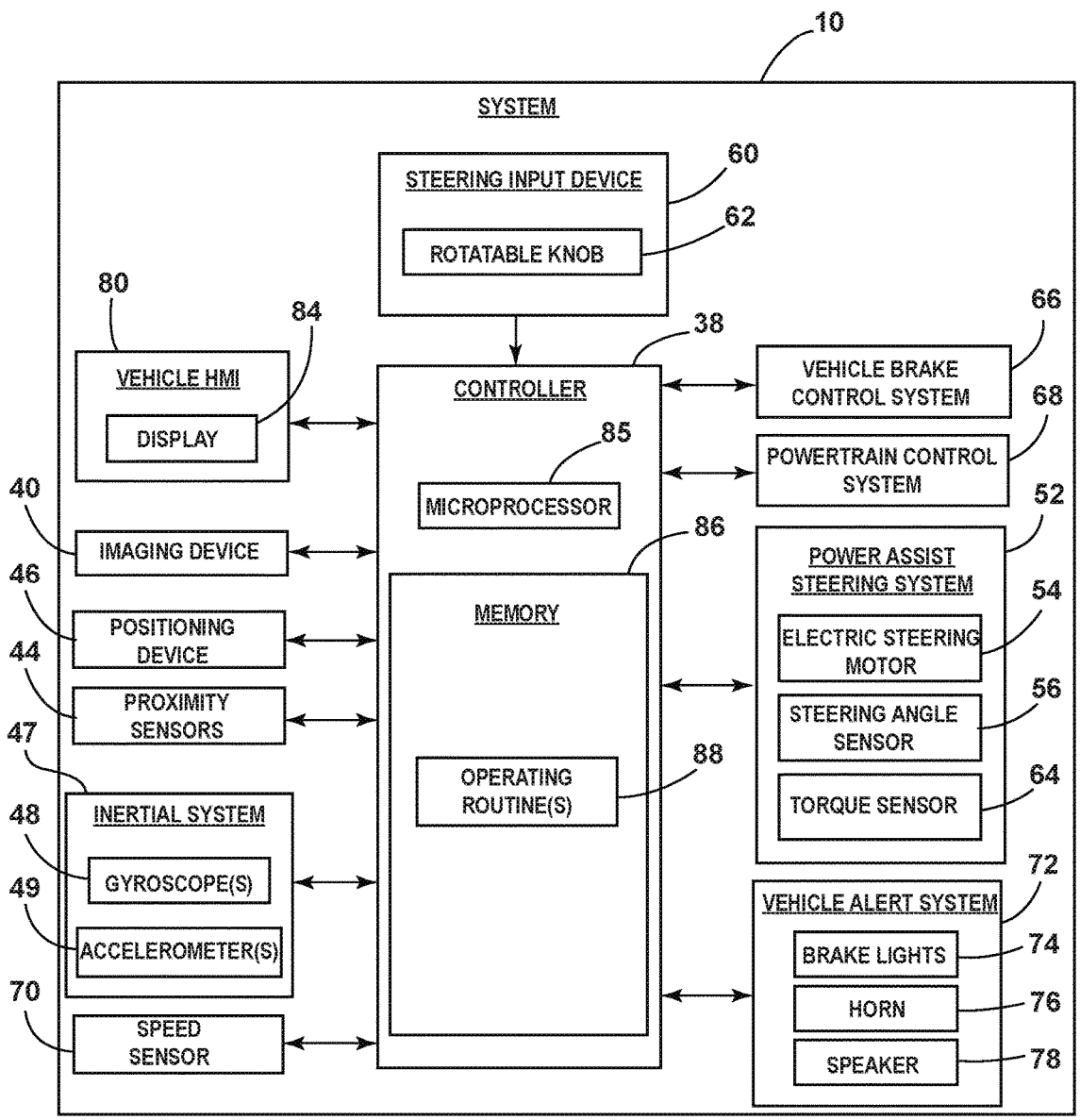
FIG. 2 is a block diagram illustrating the hitch assist system.

Referring to FIGS. 1 and 2, reference numeral 10 generally designates a hitch assist system for hitching a vehicle 12 to a trailer 14. As shown in FIG. 1, the vehicle 12 is exemplarily embodied as a pickup truck having a truck bed 16 that is accessible via a fold down tailgate 18. The vehicle 12 also includes a tow hitch in the form of a hitch ball 22 extending from a drawbar 24 that is coupled to the rear of the vehicle 12. The hitch ball 22 is configured to be received by a hitch coupler in the form of a coupler ball socket 26 that is provided at a terminal end of a trailer tongue 28. The trailer 14 is exemplarily embodied as a single axle trailer having a box frame 30 with an enclosed cargo area 32 from which the tongue 28 extends longitudinally.

The system 10 includes a controller 38 in communication with an imaging device 40 located at the rear of the vehicle 12. The imaging device 40 may be centrally located at an upper region of the tailgate 18 such that the imaging device 40 is elevated relative to the drawbar 24 and the hitch ball 22. The imaging device 40 has a field of view 42 located and oriented to capture one or more images of a rear-vehicle scene that generally includes the hitch ball 22, among other things. Images captured by the imaging device 40 may be processed by the controller 38 to identify a hitch coupler such as the coupler ball socket 26. It is contemplated that the coupler ball socket 26 may be identified using any known imaging techniques.

In addition to communicating with the imaging device 40, the controller 38 may communicate with a number of proximity sensors 44 exemplarily shown as ultrasonic sensors spaced across a lower region of the vehicle tailgate 18 and configured to detect the proximity or distance of objects located rearward of the vehicle 12. With reference to the embodiment of the system 10 shown in FIG. 2, additional vehicle-related information may be provided to the controller 38 by a positioning device 46, such as a global positioning system (GPS) located on the vehicle 12 and/or the trailer 14. Additionally, the controller 38 may communicate with an inertial system 47 including one or more gyroscopes 48 and accelerometers 49 to measure the position, orientation, direction, and/or speed of the vehicle 12.

To enable autonomous or semi-autonomous control of the vehicle 12, the controller 38 of system 10 may be further configured to communicate with a variety of vehicle equipment. According to one embodiment, the controller 38 of the system 10 may control a power assist steering system 52 of the vehicle 12 to operate the steered wheels 53 of the vehicle 12 while the vehicle 12 is reversed toward the trailer 14 along a vehicle backup path. The power assist steering system 52 may be an electric power-assisted steering (EPAS) system that includes an electric steering motor 54 for turning the steered wheels 53 to a steering angle based on a steering command generated by the controller 38, whereby the steering angle may be sensed by a steering angle sensor 56 of the power assist steering system 52 and provided to the controller 38. As described herein, the steering command may be provided for autonomously steering the vehicle 12 during a backup maneuver and may alternatively be provided manually via a rotational position (e.g., a steering wheel angle) of a steering wheel 58 or a steering input device 60, which may be provided to enable a driver to control or otherwise modify the desired curvature of the backing path of vehicle 12. The steering input device 60 may be communicatively coupled to the controller 38 in a wired or wireless manner and provides the controller 38 with information defining the desired curvature of the backing path of the vehicle 12. In response, the controller 38 processes the information and generates corresponding steering commands that are supplied to the power assist steering system 52 of the vehicle 12. In one embodiment, the steering input device 60 includes a rotatable knob 62 operable between a number of rotated positions that each provide an incremental change to the desired curvature of the backing path of the vehicle 12.

In some embodiments, the steering wheel 58 of the vehicle 12 may be mechanically coupled with the steered wheels 53 of the vehicle 12, such that the steering wheel 58 moves in concert with steered wheels 53 via an internal torque, thereby preventing manual intervention with the steering wheel 58 during autonomous steering of the vehicle 12. In such instances, the power assist steering system 52 may include a torque sensor 64 that senses torque (e.g., gripping and/or turning) on the steering wheel 58 that is not expected from autonomous control of the steering wheel 58 and is therefore indicative of manual intervention by the driver. In some embodiments, external torque applied to the steering wheel 58 may serve as a signal to the controller 38 that the driver has taken manual control and for the system 10 to discontinue autonomous steering functionality.

The controller 38 of the system 10 may also communicate with a vehicle brake control system 66 of the vehicle 12 to receive vehicle speed information such as individual wheel speeds of the vehicle 12. Additionally or alternatively, vehicle speed information may be provided to the controller 38 by a powertrain control system 68 and/or a vehicle speed sensor 70, among other conceivable means. In some embodiments, the controller 38 may provide braking commands to the vehicle brake control system 66, thereby allowing the system 10 to regulate the speed of the vehicle 12 during a backup maneuver of the vehicle 12. It should be appreciated that the controller 38 may additionally or alternatively regulate the speed of the vehicle 12 via interaction with the powertrain control system 68.

Through interaction with the power assist steering system 52, the vehicle brake control system 66, and/or the powertrain control system 68 of the vehicle 12, the potential for unacceptable backup conditions can be reduced when the vehicle 12 is backing toward the trailer 14. Examples of unacceptable backup conditions include, but are not limited to, a vehicle over-speed condition, sensor failure, and the like. In such circumstances, the driver may be unaware of the failure until the unacceptable backup condition is imminent or already happening. Therefore, it is disclosed herein that the controller 38 of the system 10 can generate an alert signal corresponding to a notification of an actual, impending, and/or anticipated unacceptable backup condition, and prior to driver intervention, generate a counter measure to prevent such an unacceptable backup condition.

According to one embodiment, the controller 38 may communicate with one or more devices, including a vehicle alert system 72, which may prompt visual, auditory, and tactile warnings. For instance, vehicle brake lights 74 and vehicle emergency flashers may provide a visual alert and a vehicle horn 76 and/or speaker 78 may provide an audible alert. Additionally, the controller 38 and/or vehicle alert system 72 may communicate with a human machine interface (HMI) 80 of the vehicle 12. The HMI 80 may include a touchscreen vehicle display 84 (FIG. 1) such as a center-stack mounted navigation or entertainment display capable of displaying images indicating the alert. Such an embodiment may be desirable to notify the driver of the vehicle 12 that an unacceptable backup condition is present.

The controller 38 is configured with a microprocessor 85 and/or other analog and/or digital circuitry for processing one or more logic routines stored in a memory 86. The logic routines may include one or more operating routines 88. Information from the imaging device 40 or other components of the system 10 can be supplied to the controller 38 via a communication network of the vehicle 12, which can include a controller area network (CAN), a local interconnect network (LIN), or other conventional protocols used in the automotive industry. It should be appreciated that the controller 38 may be a stand-alone dedicated controller or may be a shared controller integrated with the imaging device 40 or other component of the system 10 in addition to any other conceivable onboard or off-board vehicle control systems.

Figure 3:
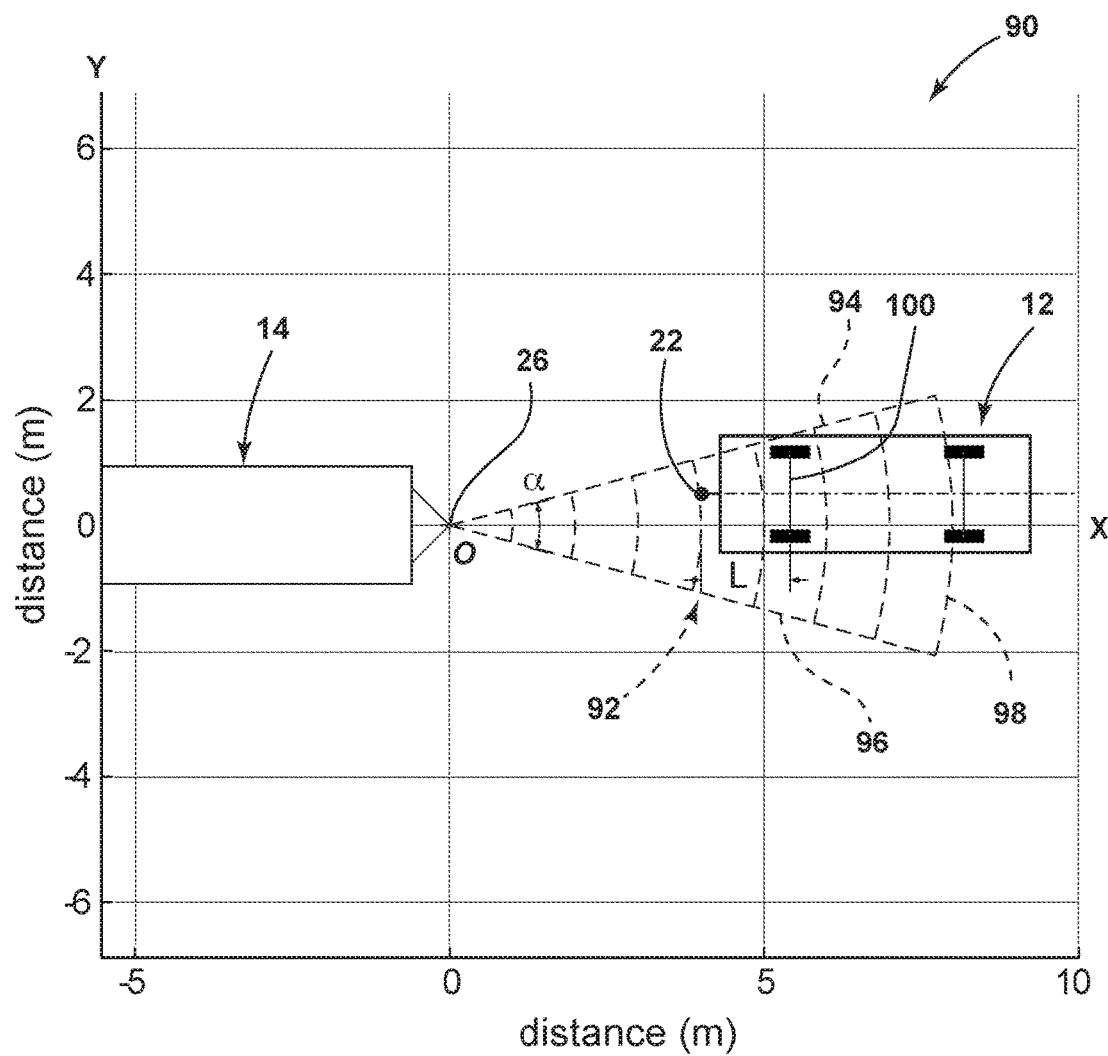
FIG. 3 illustrates the vehicle and the trailer positioned within a coordinate system along with a boundary area projecting from a trailer coupler of the trailer.

Referring to FIG. 3, the vehicle 12 and trailer 14 are shown located in a coordinate system 90. The coordinate system 90 is generated by the controller 38 to positionally relate the vehicle 12 and the trailer 14 based on information provided by the imaging device 40, positioning device 46, proximity sensors 44, or a combination thereof, for example. As depicted, the coordinate system 90 is a localized Cartesian coordinate system having an x-axis and a y-axis. The x- and y-axis each include units exemplarily shown in meters. In the depicted embodiments, the x-axis coincides with the longitudinal axis of the trailer 14, and as such, the two terms are used interchangeably herein. The coordinate system 90 includes an origin O (x=0, y=0) set at a hitch coupler shown as coupler ball socket 26. The controller 38 also generates a boundary area shown as sector 92, which originates from the coupler ball socket 26 and projects forward therefrom. The sector 92 includes the plane enclosed by a first radius 94, a second radius 96, and an arc 98 therebetween. The size of the sector 92 is based on an angle α between the first and second radii 94, 96. The angle α is provided by:

$$\alpha = 2 \tan^{-1}\left(\frac{L}{R_{min}}\right), \quad (1)$$

where L is the distance from the hitch ball 22 to a rear axle 100 of the vehicle 12, and $R_{min}$ is a minimum turning radius of the vehicle 12. As defined herein, the minimum turning radius is the radius of the largest circular turn capable by the vehicle 12.

In embodiments where the origin O is set at the hitch coupler and the x-axis coincides with the longitudinal axis of the trailer 14, the angle of the first radius 94 with respect to the longitudinal axis of the trailer 14 is provided by:

$$\psi + \frac{\alpha}{2}, \quad (2)$$

where ψ is a heading angle of the vehicle 12 with respect to the x-axis. The angle of the second radius 96 with respect to the longitudinal axis of the trailer 14 is provided by:

$$\psi - \frac{\alpha}{2}. \quad (3)$$

With respect to the depicted embodiment, where the heading angle ψ of the vehicle 12 is zero degrees, the angles of both the first and second radii 94, 96 of the $$\text{sector 92 are} + \frac{\alpha}{2} \text{ and } -\frac{\alpha}{2},$$

respectively.

Figure 4:
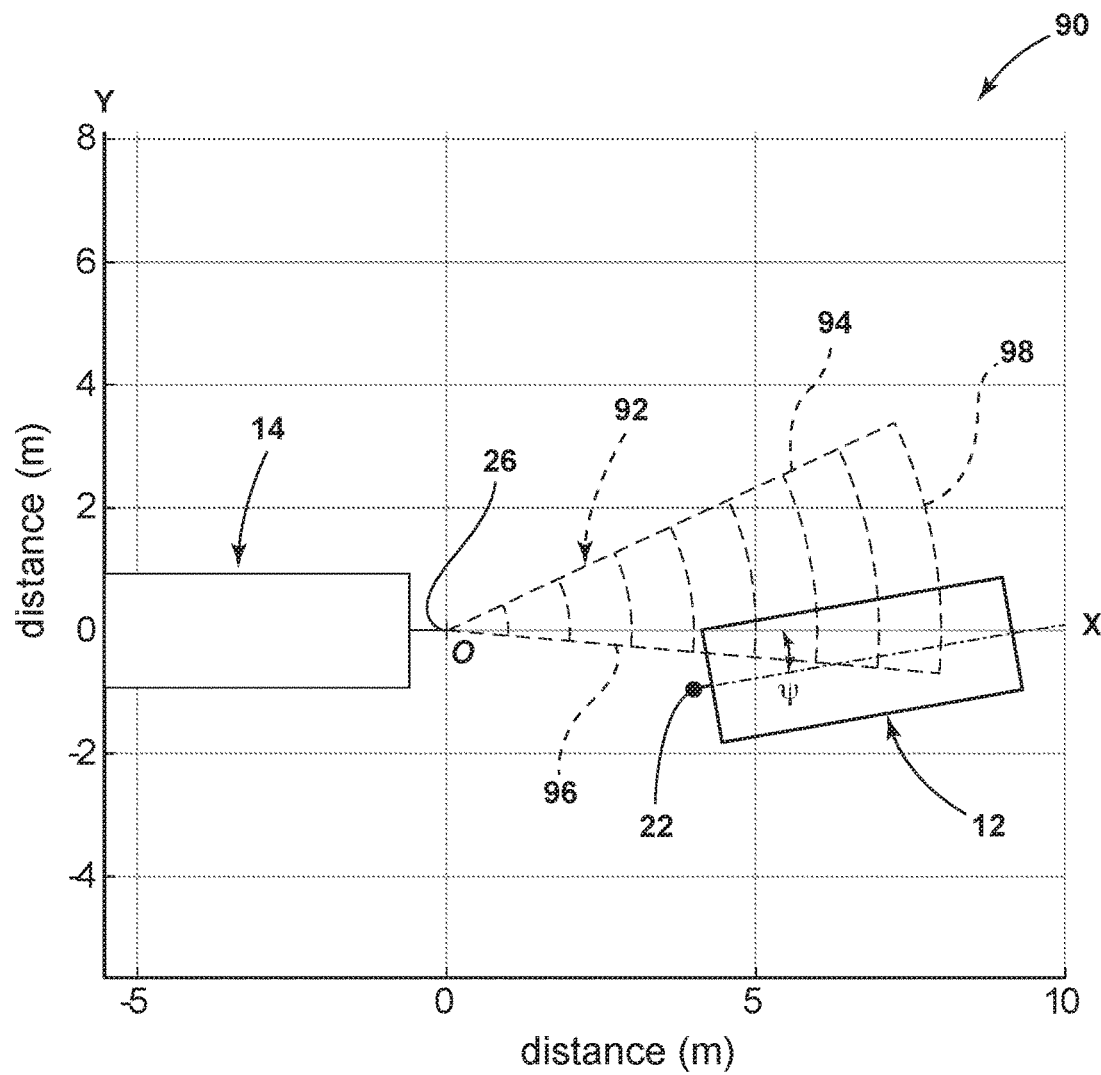
FIG. 4 illustrates the vehicle at a heading angle different than that shown in FIG. 3.

For purposes of comparison, FIG. 4 exemplarily shows the vehicle 12 at a heading angle ψ of approximately 10 degrees or $$\frac{\pi}{18}$$

radian. In this particular instance, the angles of both the first and second radii 94, 96 of the $$\text{sector 92 are} \frac{\pi}{18} + \frac{\alpha}{2} \text{ and } \frac{\pi}{18} - \frac{\pi}{2},$$

respectively. With respect to the embodiments described herein, the size of the sector 92 is fixed while its orientation or aim direction is dynamic. That is, the sector 92 rotates about the coupler ball socket 26 in response to changes in the heading angle ψ of the vehicle 12.

Figure 5:
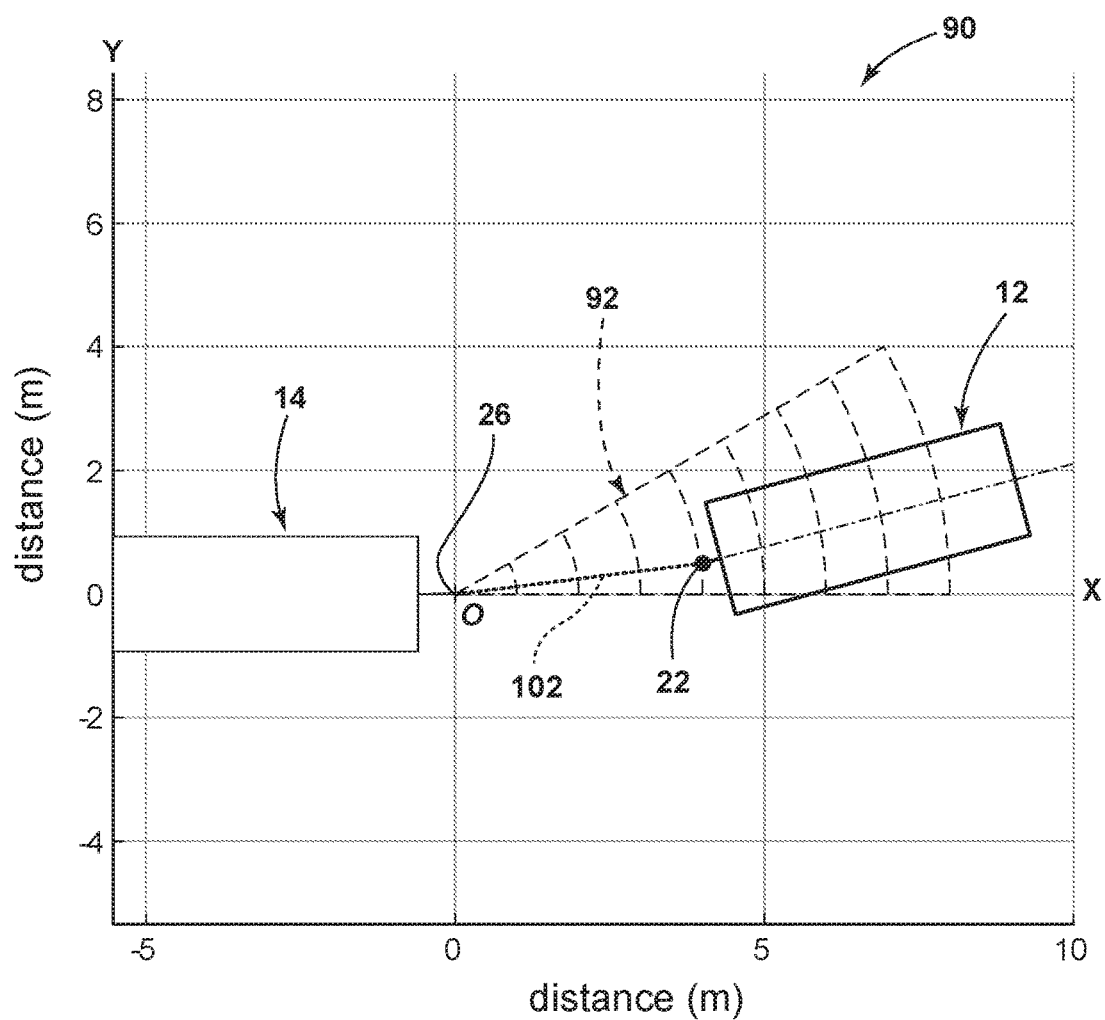
FIG. 5 illustrates a vehicle backup path defined by the controller.
Figure 6:
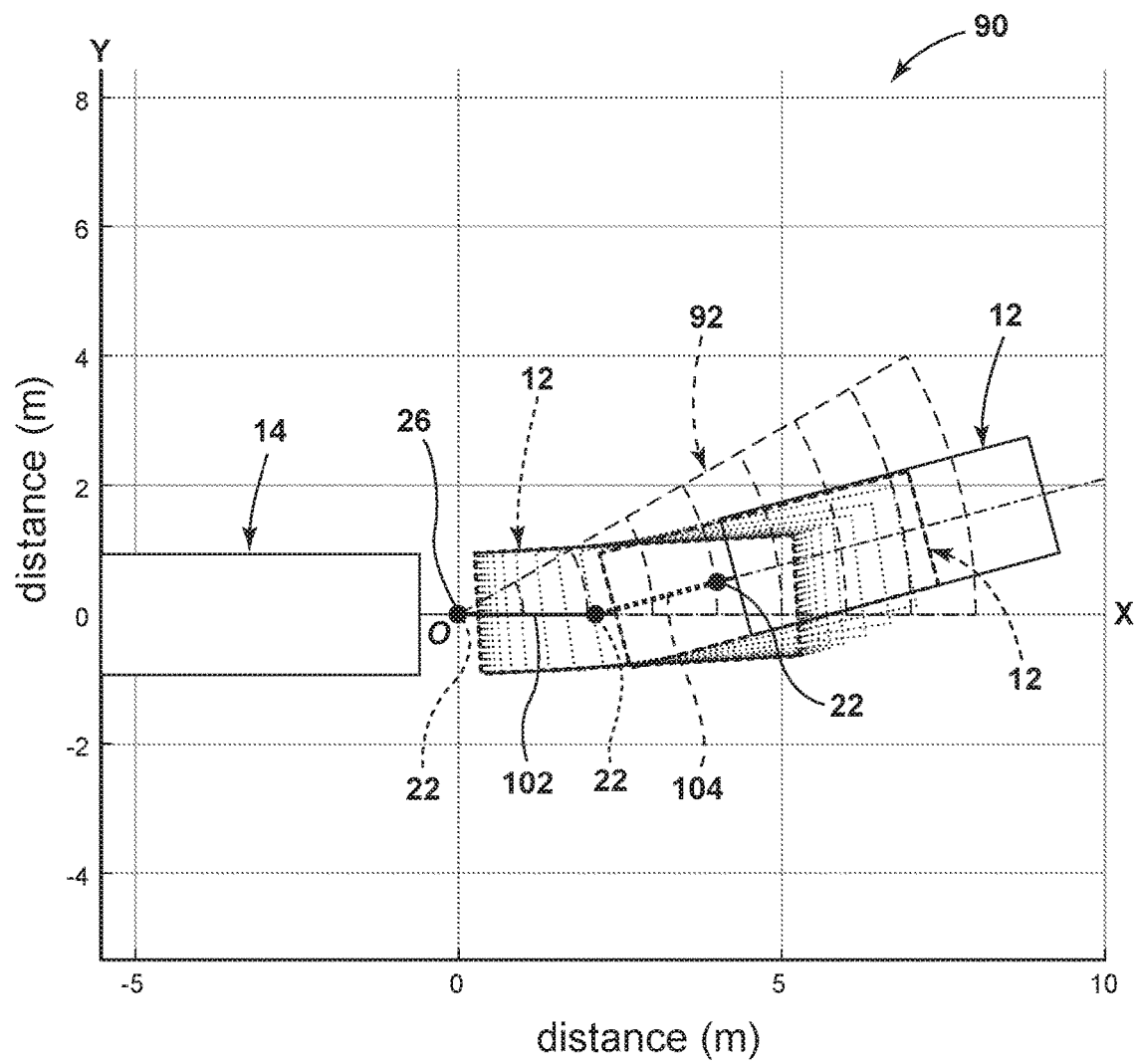
FIG. 6 illustrates an alternative vehicle backup path.

With reference to FIGS. 5 and 6, the controller 38 defines a vehicle backup path 102 toward the trailer 14 if the hitch ball 22 is located inside the sector 92. With respect to the embodiments provided herein, the vehicle backup path 102 corresponds to a trajectory of the hitch ball 22 toward the coupler ball socket 26. Once the hitch ball 22 reaches the end of its trajectory, the hitch ball 22 and coupler ball socket 26 are generally aligned to enable the trailer 14 to be hitched to the vehicle 12. As shown in FIG. 5, the vehicle backup path 102 may be straight in order to correspond to the shortest distance between the hitch ball 22 and the coupler ball socket 26. Alternatively, as shown in FIG. 6, the system 10 may first back the vehicle 12 along its current heading 104 to reduce the offset between the hitch ball 22 and the coupler ball socket 26 in the y-axis direction in an effort to better align the vehicle 12 with the trailer 14. In the depicted embodiment, the controller 38 defines the vehicle backup path 102 once hitch ball 22 intersects with the longitudinal axis of the trailer 14. In the depicted embodiment, the vehicle backup path 102 is a straight backup path coinciding with the longitudinal axis of the trailer 14. However, it will be understood that the vehicle backup path 102 may be generated at any point along the current heading 104 of the vehicle 12 leading up to and extending past the longitudinal axis of the trailer 14, assuming the hitch ball 22 remains inside the sector 92.

Figure 7:
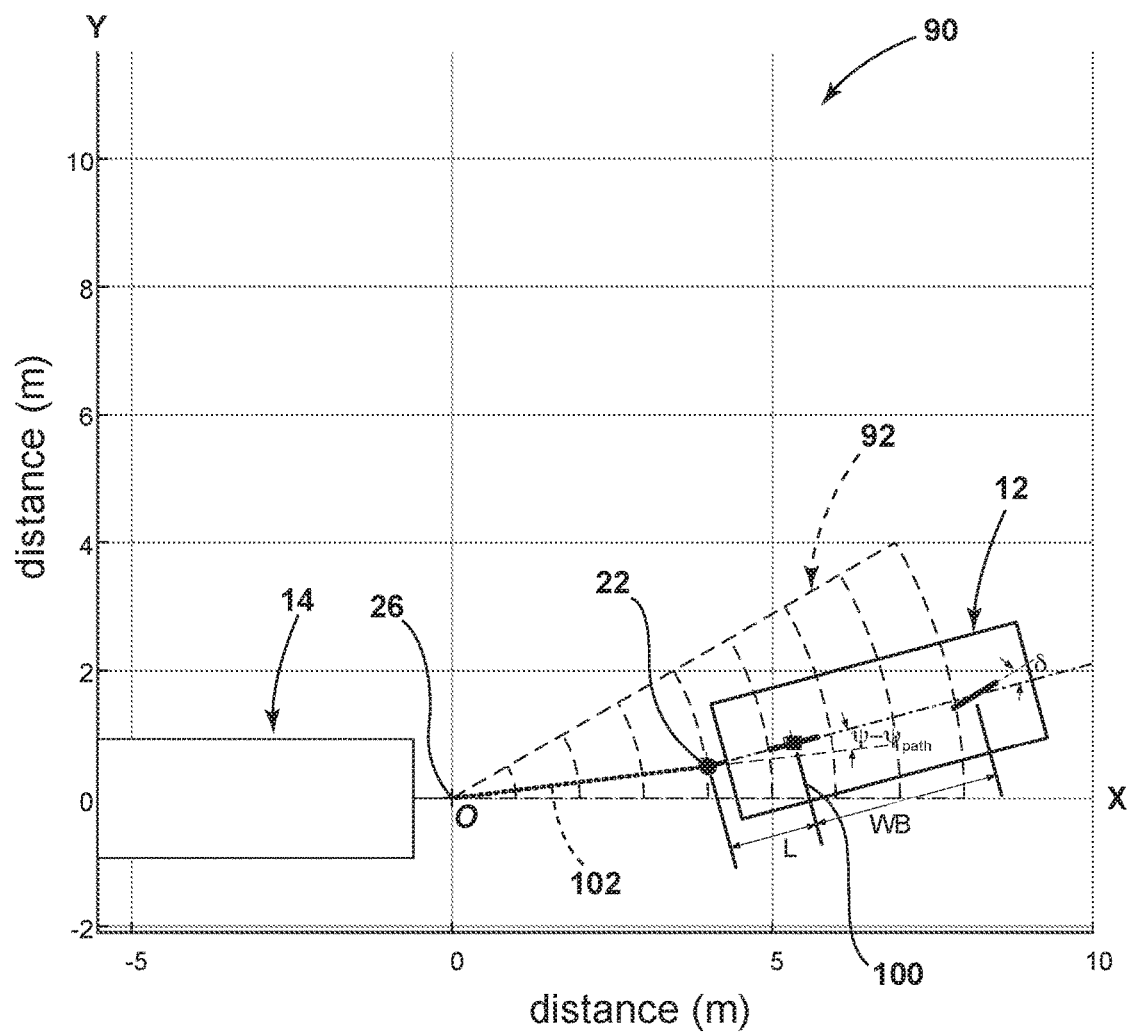
FIG. 7 illustrates kinematic variables associated with determining a steering angle of the vehicle, according to one embodiment.

With reference to FIG. 7, an angle $\psi_{path}$ of the vehicle backup path 102 with respect to the longitudinal axis of the trailer 14 is provided by:

$$\psi_{path} = \tan^{-1}\left(\frac{y_{hb} - y_{hs}}{x_{hb} - x_{hs}}\right), \quad (4)$$

where $x_{hb}, y_{hb}$ represent the x, y coordinates of the hitch ball 22, and $x_{hs}, y_{hs}$ represent the x, y coordinates of the coupler ball socket 26. Once the controller 38 determines the angle $\psi_{path}$ of the vehicle backup path 102, the controller 38 can determine a steering angle $\delta$ for steering the vehicle 12 along the vehicle backup path 102. The steering angle $\delta$ is provided by:

$$\delta = \tan^{-1}\left(\frac{WB \tan(\psi - \psi_{path})}{L}\right), \quad (5)$$

where WB is a wheelbase of the vehicle 12, L is the distance from the hitch ball 22 to the rear axle 100, and $\psi$ is the heading angle of the vehicle 12 with respect to the longitudinal axis of the trailer 14. Positive and negative values of the steering angle $\delta$ denote a backing direction of the vehicle 12 such as clockwise and counterclockwise, for example. It will be understood that other sign conventions may be used if desired.

Figure 8:
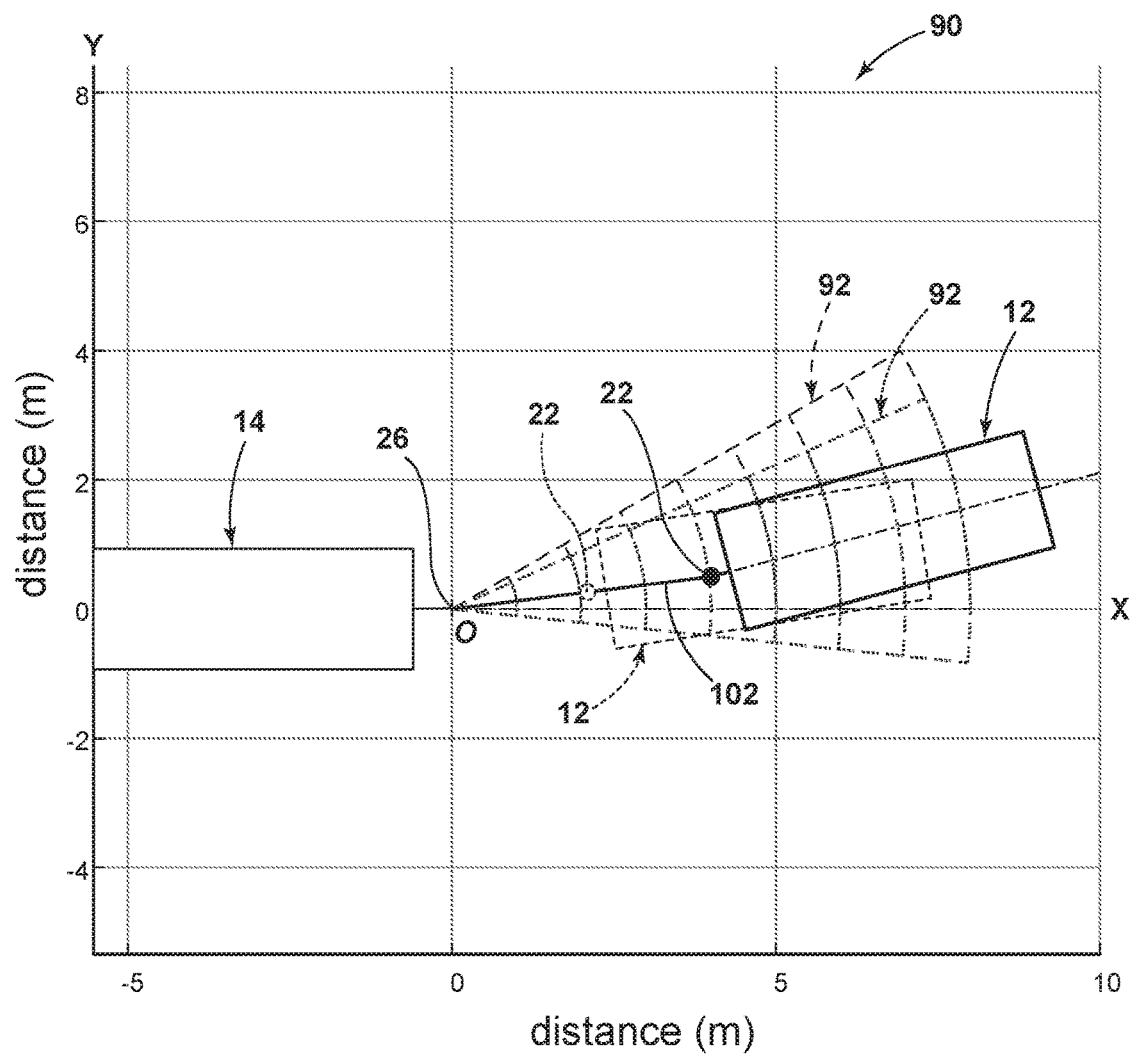
FIG. 8 illustrates the dynamic nature of the boundary area.

As described herein, the orientation or aim direction of the sector 92 changes in response to changes in the heading angle $\psi$ of the vehicle 12. For example, as shown in FIG. 8, the sector 92 rotates clockwise to a new position in response to the vehicle 12 traveling from its initial position (shown in solid lines) along backup path 102 to a later position (shown in dashed lines) along the vehicle backup path 102. The dynamic aspect of the sector 92 enables the controller 38 to redefine the vehicle backup path 102 in the event of tracking errors such as incorrect coordinates being assigned to the coupler ball socket 26. To help reduce tracking errors, a feedback term $K_p e_y$ may be subtracted from equation 5, where $K_p$ is a proportional gain and $e_y$ is the distance from the hitch ball 22 to the vehicle backup path 102.

In situations where the hitch ball 22 is located outside the sector 92, the system 10 may notify the driver of the same via the vehicle alert system 72. In some embodiments, the controller 38 generates the coordinate system 90 on the vehicle display 84 as a visual aid to guide the driver of the vehicle 12 in making maneuvers in order to position the hitch ball 22 inside the sector 92. In other embodiments, the system 10 may autonomously or semi-autonomously maneuver the vehicle 12 to position the hitch ball 22 inside the sector 92. Regardless of whether the maneuvers are done manually or autonomously, it will be understood that maneuvers for positioning the hitch ball 22 inside the sector 92 include pulling the vehicle 12 forward, backing the vehicle 12, or a combination thereof. Under an autonomous control scheme, the controller 38 may operate the vehicle brake control system 66, powertrain control system 68, and power assist steering system 52 such that the driver need only monitor the maneuvering of the vehicle 12. In contrast, under a semi-autonomous control scheme, the controller 38 may operate only some of the foregoing components, thus requiring driver intervention. For example, the driver may be required to apply gas and brakes while the controller 38 operates the power assist steering system 52 to maneuver the vehicle 12 into the sector 92. In any event, once the hitch ball 22 is inside the sector 92, the controller 38 may generate the vehicle backup path 102 and determine the corresponding steering angle $\delta$ according to any of the embodiments described herein. To back the vehicle 12 along the vehicle backup path 102, it will be understood that the system 10 may assume autonomous or semi-autonomous control of the vehicle 12. Alternatively, the driver may back the vehicle 12 along the vehicle backup path 102 using the coordinate system 90 and sector 92 generated on the vehicle display 84, if provided.

Figure 9:
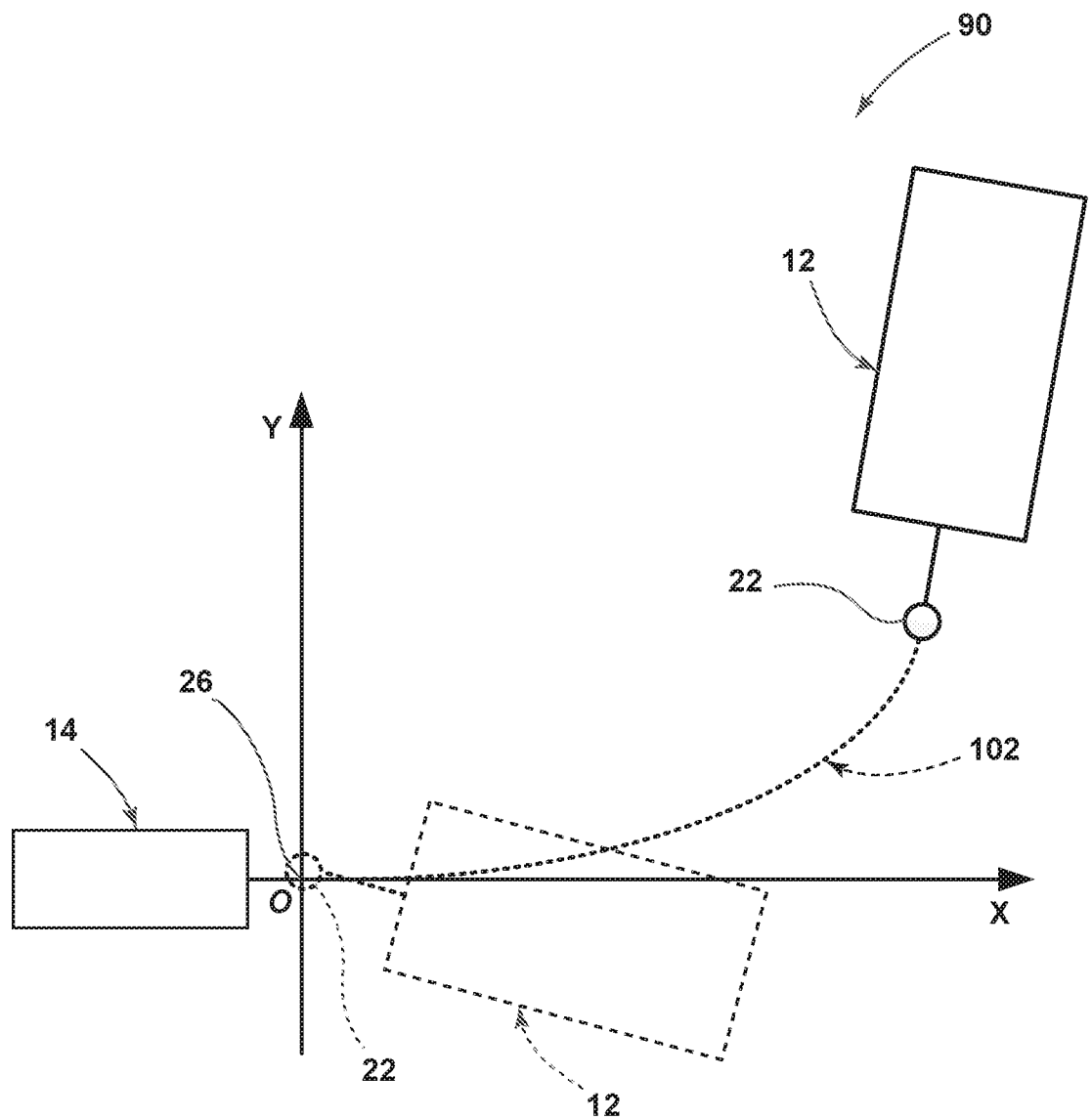
FIG. 9 illustrates yet another alternative vehicle backup path.

Referring to FIG. 9, the vehicle backup path 102 is shown according to another embodiment. As depicted, the vehicle backup path 102 occurs along a trajectory that is entirely circular and having a constant curvature. The steering angle $\delta$ is provided by:

$$\delta = \tan^{-1}\left(\frac{2WB(\Delta x_{ball}\sin(\varphi) - \Delta y_{ball}\cos(\varphi))}{\Delta x_{ball}^2 + \Delta y_{ball}^2 + 2L\Delta x_{ball}\cos(\varphi) + 2L\Delta y_{ball}\sin(\varphi)}\right), \quad (6)$$

where WB is the wheelbase of the vehicle 12, L is the distance from the hitch ball 22 to the rear axle 100, and $\varphi$ is the heading angle of the vehicle 12. $\Delta y_{ball} = y_{ball} - y_{ball}^0$ and $\Delta x_{ball} = x_{ball} - x_{ball}^0$, where $x_{ball}, y_{ball}$ is a current position of the hitch ball 22 that corresponds to the heading angle $\varphi$, and $x_{ball}^0, y_{ball}^0$ is an initial position of the hitch ball 22 prior to the hitch ball 22 moving to the current position. Positive and negative values of the steering angle $\delta$ denote a backing direction of the vehicle 12 such as clockwise and counterclockwise, for example. Thus, with WB and L assumed to be known and constant, the steering angle $\delta$ is determined based on the heading angle $\varphi$ of the vehicle 12 and a positional change of the hitch ball 22.

Figure 10:
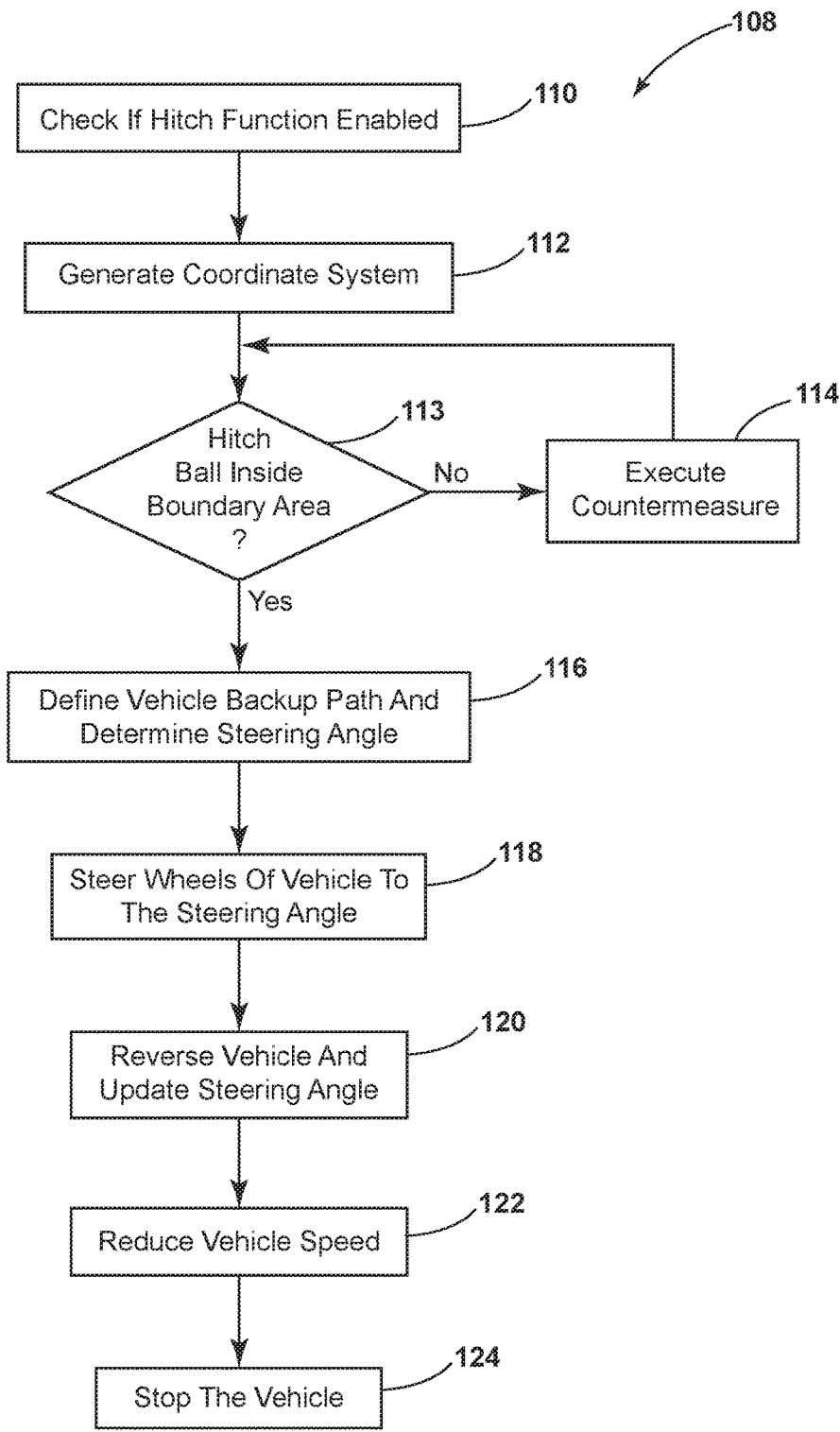
FIG. 10 is a flow diagram of a hitch assist method incorporating the vehicle backup path shown in FIG. 9.

Referring to FIG. 10, a method 108 of hitching the vehicle 12 to the trailer 14 is shown according to one embodiment. The method 108 may be embodied as one of the operating routine(s) 88 of the controller 38 and incorporates the vehicle backup path 102 shown in FIG. 9. In other words, the method 108 provides for a backup path having a trajectory that is entirely circular. The method 108 starts at step 110, where the controller 38 checks if a hitch function is enabled, or in other words, whether a request has been made to hitch the vehicle 12 to the trailer 14. For example, the request may be made using the touchscreen vehicle display 84. At step 112, the controller 38 generates a coordinate system (e.g., coordinate system 90), and at step 113, checks if the hitch ball 22 is located inside a boundary area (e.g., sector 92) as described previously herein. If the hitch ball 22 is not located inside the boundary area, the controller 38 executes a countermeasure to position the hitch ball 22 inside the boundary area at step 114. For example, the countermeasure may include guiding the driver in maneuvering the vehicle 12 such that the hitch ball 22 enters the boundary area or maneuvering the vehicle 12 autonomously or semi-autonomously to accomplish the same.

If the hitch ball 22 is located inside the boundary area, the controller 38 defines the vehicle backup path 102 and determines the steering angle δ according to equation 6 at step 116. At step 118, the wheels 53 of the vehicle 12 are steered to the steering angle determined in step 116. Preferably, steps 116 and 118 are performed while the vehicle 12 is at a standstill, or in other words, stopped or not moving. At step 120, the vehicle 12 is reversed and the steering angle δ, as determined using equation 6, is continuously updated based on the heading angle of the vehicle 12 and the positional change of the hitch ball 22. As a result, the vehicle 12 reverses along an entirely circular path (e.g., vehicle backup path 102, FIG. 9) terminating at or near the coupler ball socket 26. As the hitch ball 22 approaches the coupler ball socket 26, the speed of the vehicle 12 is reduced at step 122. At step 124, the vehicle 12 is stopped once the hitch ball 22 arrives at or near coupler ball socket 26, thus signaling the end of the method 108. As the vehicle 12 comes to a stop, the controller 38 may issue steering commands to straighten out the wheels 53 of the vehicle 12 to a neutral position.

Figure 11:
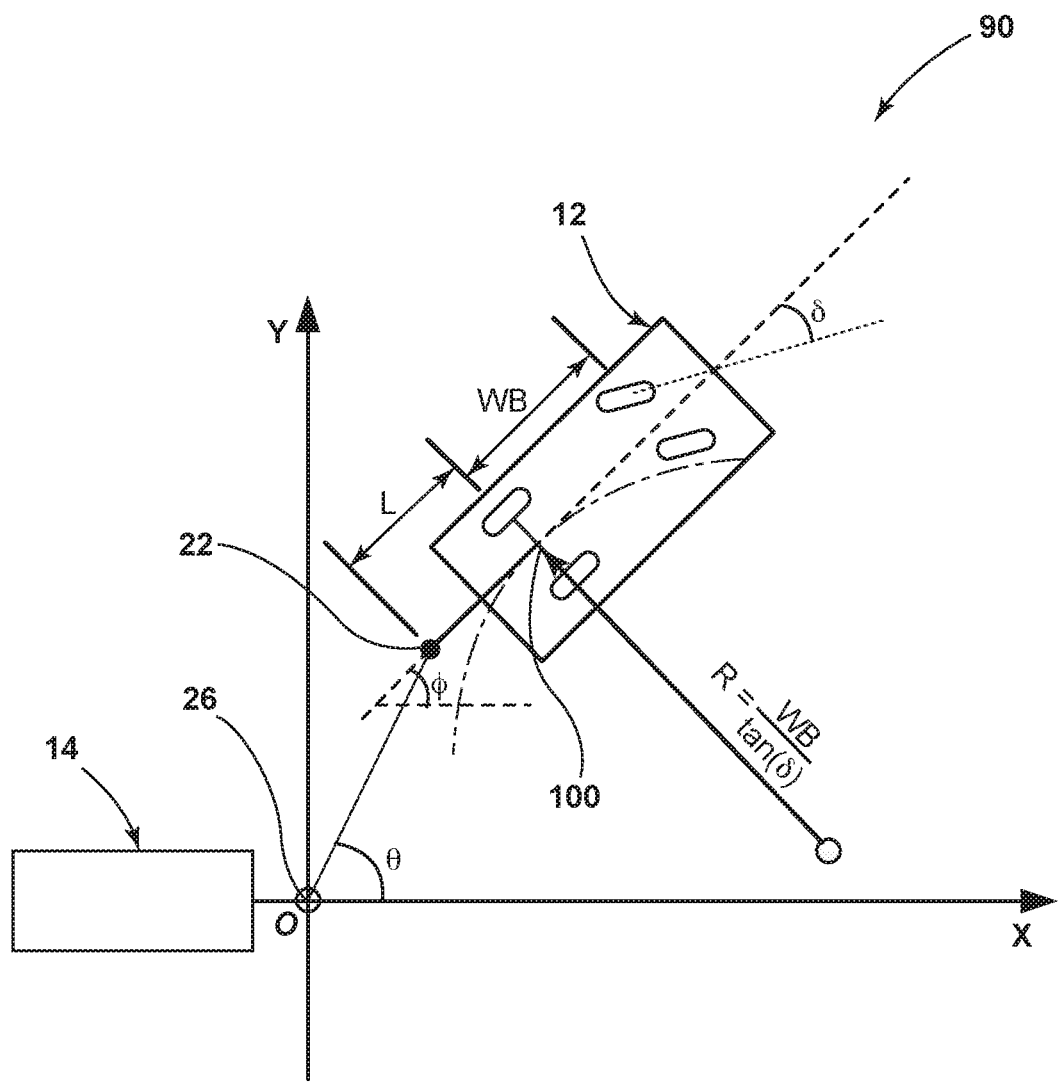
FIG. 11 illustrates a kinematic relationship between a steering angle and a turn radius of the vehicle.

Referring to FIG. 11, a kinematic relationship between the steering angle δ and a turn radius R of the vehicle 12 is shown, where L is the distance from the hitch ball 22 to the rear axle 100, WB is the wheelbase, φ is the heading angle of the vehicle 12 with respect to the longitudinal axis of the trailer 14, and θ is the angle between the hitch ball 22, the coupler ball socket 26, and the longitudinal axis of the trailer 14. Regarding FIG. 11, the coupler ball socket 26 coincides with the origin O and the longitudinal axis of the trailer 14 coincides with the x-axis.

Figure 12:
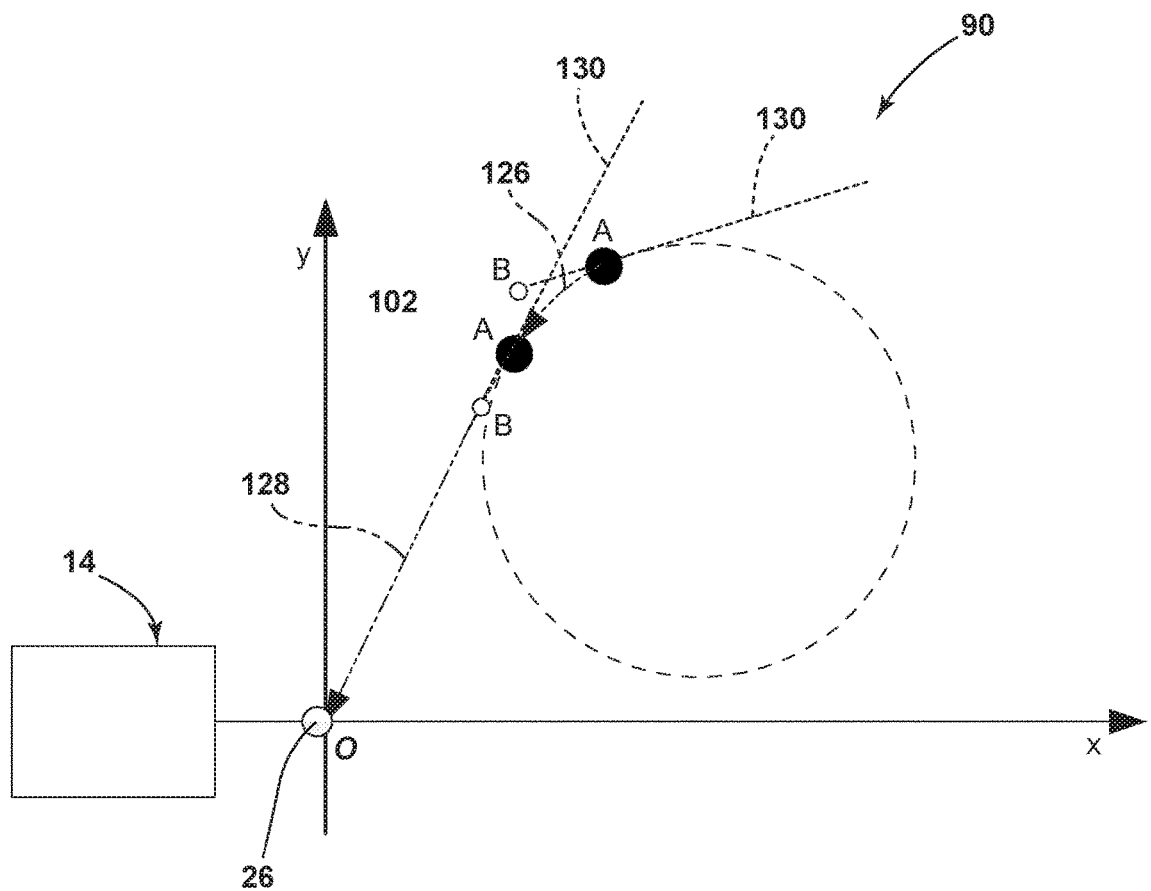
FIG. 12 illustrates yet another alternative vehicle backup path.

Referring to FIG. 12, the vehicle backup path 102 is shown according to yet another embodiment. As depicted, the vehicle backup path 102 is defined by two distinct trajectories shown as a first trajectory 126 followed by a second trajectory 128. The first trajectory 126 is circular and has a constant curvature while the second trajectory 128 is straight and points to the coupler ball socket 26. For purposes of illustration, the vehicle 12 is shown as a simplified bicycle model at the start of the first trajectory 126 and at the start of the second trajectory 128. At each position, the vehicle 12 is represented by points A and B, both of which are located on a longitudinal axis 130 of the vehicle 12. Point A corresponds to a midpoint of the rear axle 100 and point B corresponds to the hitch ball 22. According to one embodiment, the first trajectory 126 is realized by turning the vehicle 12 at a maximum steering angle. As depicted, the vehicle 12 transitions from the first trajectory 126 to the second trajectory 128 when points A and B are aligned with the origin O, that is, when the midpoint of the rear axle 100, the hitch ball 22, and the coupler ball socket 26 are aligned with each other. Said differently, the transition from the first trajectory 126 to the second trajectory 128 occurs when the longitudinal axis 130 of the vehicle 12 points toward or intersects with the coupler ball socket 26. The steering angle δ of the vehicle 12 while traveling along the second trajectory 128 is provided by:

$$\delta = \tan^{-1}\left(\frac{WB \tan(k_p(\phi - \theta))}{L}\right), \quad (7)$$

where L is the distance from the hitch ball 22 to the rear axle 100, WB is the wheelbase, φ is the heading angle of the vehicle 12 with respect to the longitudinal axis of the trailer 14, θ is the angle between the hitch ball 22, the coupler ball socket 26, and the longitudinal axis of the trailer 14, and $k_p$ is a feedback coefficient for correction sensitivity. $k_p$ may be a dynamic value based on a distance of the hitch ball 22 to the coupler ball socket 26. Alternatively, $k_p$ may be a constant value. In some embodiments, $k_p$ is set to 1 when the hitch ball 22 nears the coupler ball socket 26 to ensure that the vehicle 12 is reversing in a straight line. Positive and negative values of the steering angle δ denote a backing direction of the vehicle 12 such as clockwise and counterclockwise, for example.

Figure 13:
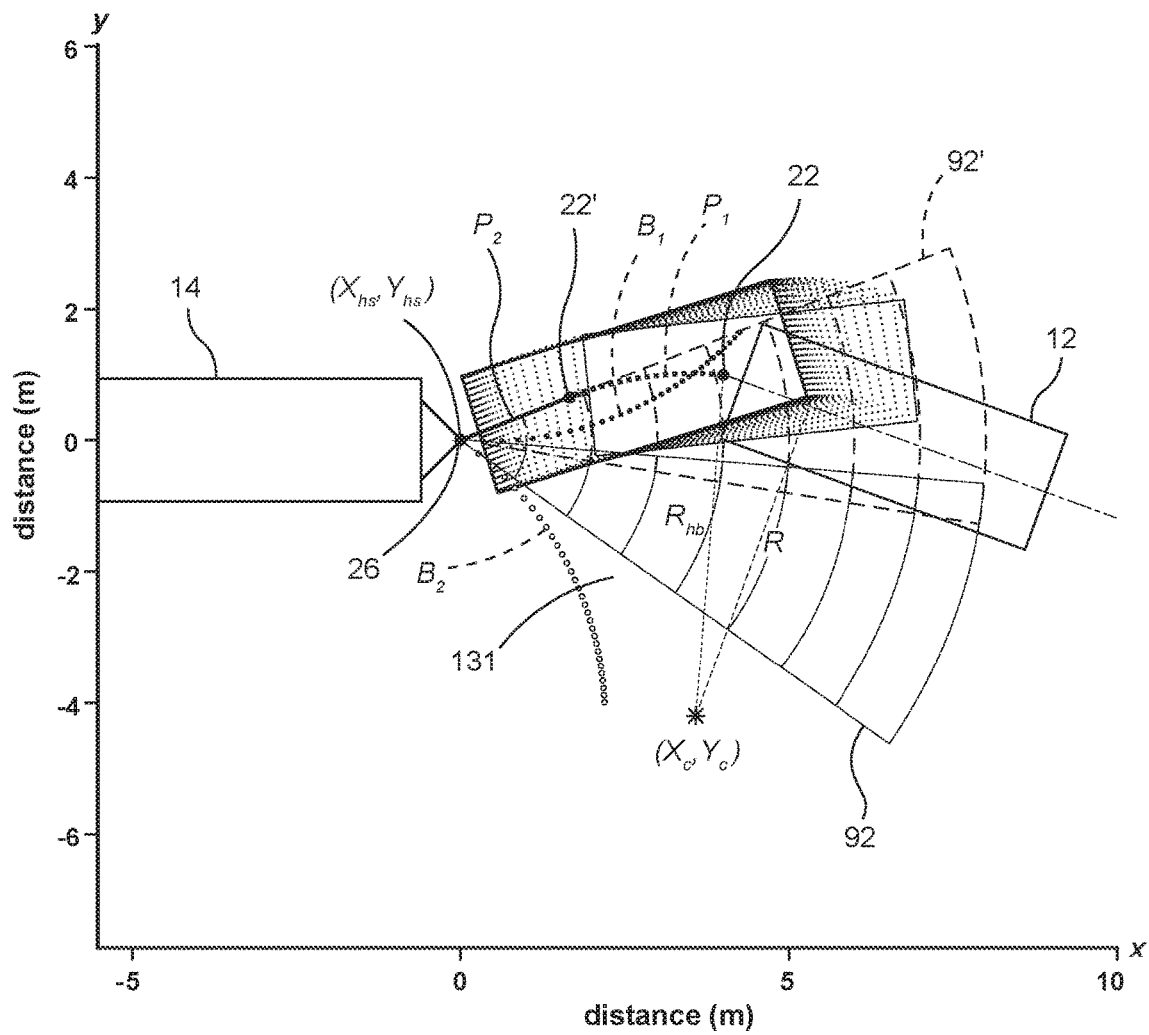
FIG. 13 illustrates a backup maneuver for a scenario where a tow hitch of the vehicle is located the boundary area.

Referring to FIG. 13, a vehicle backing maneuver is shown for a scenario where the hitch ball 22 is located outside the sector 92. In such scenarios, the controller 38 may determine whether the hitch ball 22 is within a region 131 located in front of the trailer 14 and defined by a first bound $B_1$ and a second bound $B_2$, both of which originating from the coupler ball socket 26 of the trailer 14 and determined based on a turning radius $R_{hb}$ of the hitch ball 22 and a distance between a turning center $(x_c, y_c)$ of the vehicle 12 and the coupler ball socket 26 of the trailer 14. The turning center $(x_c, y_c)$ defines a coordinate of a point located on a line $L_1$ passing through the rear axle 100 of the vehicle 12. If the hitch ball 22 is located within region 131, the controller 38 may determine a constant curvature path $P_1$ to reverse the vehicle 12 so as to move the hitch ball 22 inside the sector 92.

The turning radius $R_{hb}$ of the hitch ball 22 is provided by:

$$R_{hb} = \sqrt{R^2 + L^2} \quad (8),$$

where R is a turning radius (e.g., minimum turning radius) of the vehicle 12 and L is the distance from the hitch ball 22 to the rear axle 100 of the vehicle 12.

If the turning radius $R_{hb}$ of the hitch ball 22 is less than or equal to the distance between the turning center $(x_c, y_c)$ of the vehicle 12 and the coupler ball socket 26 $(x_{hs}, y_{hs})$ of the trailer 14, i.e., $$R_{hb} \leq \sqrt{(x_c - x_{hs})^2 + (y_c - y_{hs})^2} \quad (9),$$

then the vehicle 12 may be reversed along constant curvature path $P_1$ to move the hitch ball 22 inside the sector 92.

To determine the first and second bounds $B_1$, $B_2$, the controller 38 may assume the heading angle φ of the vehicle 12 is zero and defines the an x-coordinate of a point on the first and second bounds $B_1$, $B_2$ as $x_{bd,0} = x_{hs} + \Delta x$, where $x_{hs}$ is the x-coordinate of the coupler ball socket 26 and Δx is a positive number representing an offset between the hitch ball 22 and the coupler ball socket 26 in the x-direction. A y-coordinate of the point on the first bound $B_1$ is given by:

$$y_{B_1,0} = y_{hs} + R - \sqrt{R_{hb}^2 - (\Delta x + L)^2} \quad (10),$$

where $y_{hs}$ is the y-coordinate of the coupler ball socket 26, R is the turning radius of the vehicle 12, $R_{hb}$ is the turning radius of the hitch ball 22, and L is the distance from the hitch ball 22 to the rear axle 100 of the vehicle 12.

By assuming the heading angle φ of the vehicle 12 to be zero, the second bound $B_2$ is symmetric to the first bound $B_1$ across $y=y_{hs}$, therefore the y-coordinate of the point on the second bound $B_2$ is given by:

$$y_{B_2,0} = y_{hs} - R + \sqrt{R_{hb}^2 - (\Delta x + L)^2} \qquad (11).$$

By varying $\Delta x$ between 0 and $R_{hb}$, the first and second bounds $B_1$, $B_2$ may be determined by the controller 38 and points of the first and second bounds $B_1$, $B_2$ are provided by:

$$\begin{bmatrix} x_{B_2} \\ y_{B_2} \end{bmatrix} = \begin{bmatrix} \cos\phi & -\sin\phi \\ \sin\phi & \cos\phi \end{bmatrix} \begin{bmatrix} x_{bd,0} & -x_{hs} \\ y_{B_2,0} & -y_{hs} \end{bmatrix} + \begin{bmatrix} x_{hs} \\ y_{hs} \end{bmatrix} \qquad (12)$$

$$\begin{bmatrix} x_{B_1} \\ y_{B_1} \end{bmatrix} = \begin{bmatrix} \cos\phi & -\sin\phi \\ \sin\phi & \cos\phi \end{bmatrix} \begin{bmatrix} x_{bd,0} & -x_{hs} \\ y_{B_1,0} & -y_{hs} \end{bmatrix} + \begin{bmatrix} x_{hs} \\ y_{hs} \end{bmatrix} \qquad (13)$$

With continued reference to FIG. 13, the hitch ball 22 is shown located within region 131. Accordingly, the controller 38 issues steering commands steering the vehicle 12 as the vehicle 12 is reversed along constant curvature path $P_1$. As the vehicle 12 is reversed along constant curvature path P1, the sector 92 rotates based on the current heading angle of the vehicle 12. Once the hitch ball 22' is located inside the sector 92', the controller 38 generates steering commands for steering the vehicle 12 as the vehicle 12 is reversed along straight path P2. The steering angle δ for reversing the vehicle 12 along straight path P2 may be determined using equation 5 provided herein. As discussed herein, a feedback term $K_p e_y$ may be subtracted from equation 5 to help reduce tracking errors. It is contemplated that region 131, the first and second bounds $B_1$, $B_2$, and the sector 92 may be dynamically displayed on the touchscreen vehicle display 84 to guide the driver before or during a backup maneuver.

In scenarios where the hitch ball 22 is located outside region 131, the controller 38 may generate instructions to pull the vehicle 12 forward along a straight path or a curved path until the hitch ball 22 is located inside the sector 92. Once inside, the vehicle 12 may be reversed toward the trailer pursuant to the methodologies described herein. Accordingly, it is to be understood that the reversing of the vehicle 12 toward the trailer 14 may occur along a straight path and/or a curved path.

Figure 14:
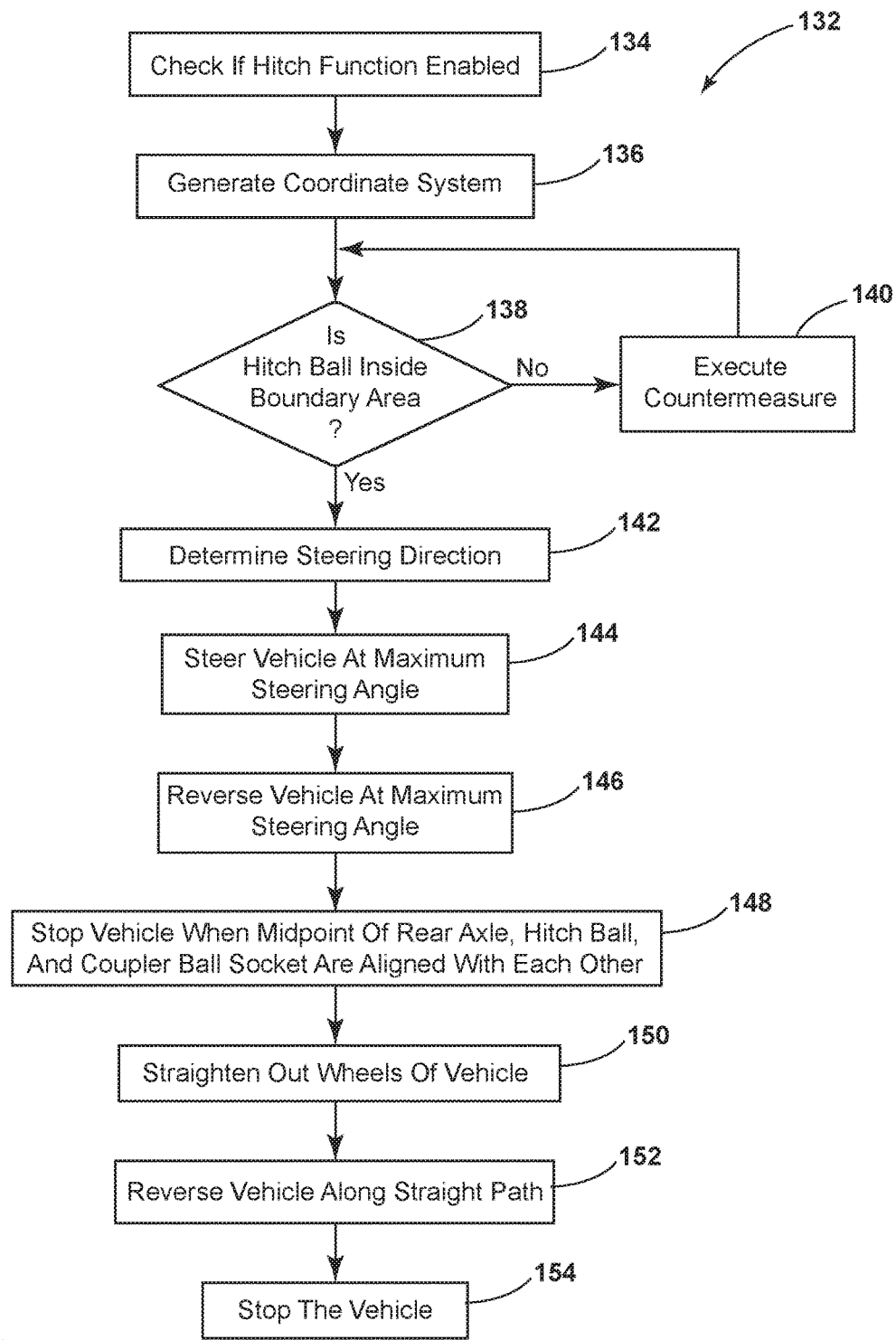
FIG. 14 is a flow diagram of a hitch assist method incorporating the vehicle backup path shown in FIG. 12.

Referring to FIG. 14, a method 132 of hitching the vehicle 12 to the trailer 14 is shown according to another embodiment. The method 132 may be embodied as one of the operating routine(s) 88 of the controller 38 and incorporates the vehicle backup path 102 shown in FIG. 12. In other words, the method 132 provides for a backup path having a circular trajectory followed by a straight trajectory. The method 132 starts at step 134, where the controller 38 checks if a hitch function is enabled, or in other words, whether a request has been made to hitch the vehicle 12 to the trailer 14. At step 136, the controller 38 generates a coordinate system (e.g., coordinate system 90), and at step 138, checks if the hitch ball 22 is located inside a boundary area (e.g., sector 92) as described previously herein. If the hitch ball 22 is not located inside the boundary area, the controller 38 executes a countermeasure to position the hitch ball 22 inside the boundary area at step 140. For example, the countermeasure may include checking to see if the hitch ball 22 is located within region 131 (FIG. 13), and if so, reversing the vehicle 12 accordingly or guiding the driver in maneuvering the vehicle 12 such that the hitch ball 22 enters the boundary area as described herein.

If the hitch ball 22 is located in the boundary, the controller 38 determines a steering direction for the vehicle 12 at step 142. To do so, the controller 38 compares the heading angle φ to the angle θ between the hitch ball 22, the coupler ball socket 26, and the longitudinal axis of the trailer 14. If the heading angle φ is greater than angle θ, the vehicle 12 is steered such that a backup maneuver occurs in a counterclockwise direction. Otherwise, if the heading angle φ is less than angle θ, the vehicle 12 is steered such that a backup maneuver occurs in a clockwise direction. Once the steering direction has been determined, the controller 38 issues steering commands to the power assist steering system 52 to steer the vehicle 12 at a maximum steering angle at step 144.

Preferably, steps 142 and 144 are performed while the vehicle 12 is stopped. Subsequent to the wheels 53 of the vehicle 12 being steered to the maximum steering angle, the vehicle 12 is reversed while maintaining the maximum steering angle at step 146. At step 148, the vehicle 12 is stopped when the midpoint of the rear axle 100, the hitch ball 22, and the coupler ball socket 26 are aligned with each other. At step 150, the controller 38 issues steering commands in order to straighten out the wheels 53 of the vehicle 12 to a neutral position. At step 152, the vehicle 12 is reversed toward the coupler ball socket 26 along a straight path. To help maintain the vehicle 12 along the straight path, the controller 38 may perform updates on the steering angle δ by iterating equation 7. At step 154, the vehicle 12 is stopped once the hitch ball 22 arrives at or near coupler ball socket 26, thus signaling the end of the method 132.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A hitch assist system comprising:
a device configured to detect a hitch coupler of a trailer; and
a controller in communication with the device and configured to:
generate a boundary area projecting from the hitch coupler;
define a vehicle backup path toward the trailer if a tow hitch of a vehicle is located inside the boundary area; and
determine a steering angle for steering the vehicle along the vehicle backup path.

2. The system of claim 1, wherein the hitch coupler comprises a coupler ball socket and the tow hitch comprises a hitch ball.

3. The system of claim 1, wherein the boundary area is a sector that includes a plane enclosed by a first radius, a second radius, and an arc therebetween.

4. The system of claim 3, wherein the size of the sector is based on an angle between the first and second radii, the angle determined based on a minimum turning radius of the vehicle and a distance from the tow hitch to a rear axle of the vehicle.

5. The system of claim 1, wherein the boundary area has a fixed size and an aim direction that changes based on a heading angle of the vehicle with respect to a longitudinal axis of the trailer.

6. The system of claim 1, wherein the vehicle backup path has a trajectory corresponding to the shortest distance between the tow hitch and the hitch coupler.

7. The system of claim 6, wherein the steering angle is based on an angle of the vehicle backup path with respect to a longitudinal axis of the trailer, and a heading angle of the vehicle with respect to the longitudinal axis of the trailer.

8. The system of claim 1, wherein the vehicle backup path has a trajectory that is entirely circular and having a constant curvature.

9. The system of claim 8, wherein the steering angle is based on a heading angle of the vehicle with respect to a longitudinal axis of the trailer, and a positional change of the tow hitch.

10. The system of claim 1, wherein the vehicle backup path has a first trajectory that is circular followed by a second trajectory that is straight.

11. The system of claim 10, wherein the first trajectory transitions to the second trajectory when a longitudinal axis of the vehicle intersects with the hitch coupler.

12. The system of claim 1, wherein if the tow hitch is located outside the boundary area, the controller determines if the tow hitch is located in a region in front of the trailer and defined by a first bound and a second bound, and wherein if the tow hitch is located inside the region, the controller determines a backup path for reversing the vehicle so as to move the tow hitch inside the boundary area.

13. The system of claim 12, further comprising a display for dynamically displaying at least one of the region and the boundary area.

14. A hitch assist system comprising:
a device configured to detect a hitch coupler of a trailer; and
a controller in communication with the device and configured to:
define a vehicle backup path terminating at or near the hitch coupler, wherein the vehicle backup path has a trajectory that is at least one of circular and straight;
define the vehicle backup path if a tow hitch of a vehicle is located inside a dynamic boundary area projecting from the hitch coupler; and
determine a steering angle for steering the vehicle along the vehicle backup path.

15. The system of claim 14, wherein the boundary area is a sector that includes a plane enclosed by a first radius, a second radius, and an arc therebetween, and wherein the size of the sector is based on an angle between the first and second radii, the angle determined based on a minimum turning radius of the vehicle and a distance from the tow hitch to a rear axle of the vehicle.

16. The system of claim 14, wherein the boundary area has a fixed size and an aim direction that changes based on a heading angle of the vehicle with respect to a longitudinal axis of the trailer.

17. The system of claim 14, wherein the vehicle backup path has a trajectory corresponding to the shortest distance between a tow hitch of the vehicle and the hitch coupler.

18. The system of claim 14, wherein the vehicle backup path has a trajectory that is entirely circular and having a constant curvature or a trajectory that is circular and then straight.

19. A hitch assist method comprising the steps of:
detecting a hitch coupler of a trailer;
generating a boundary area projecting from the hitch coupler;
defining a vehicle backup path toward the trailer if a tow hitch of a vehicle is located inside the boundary area; and
determining a steering angle for steering the vehicle along the vehicle backup path.

* * * * *